United States Patent Office
2,936,299
Patented May 10, 1960

2,936,299

ORGANO-TIN COMPOUNDS

Abraham Bavley, Brooklyn, and Charles J. Knuth, Flushing, N.Y., assignors to Chas. Pfizer & Co., Inc., New York, N.Y., a corporation of Delaware No Drawing. Application December 17, 1957
Serial No. 703,277

4 Claims. (Cl. 260—45.75)

This invention is concerned with new and useful compounds and compositions containing them. More particularly, it relates to new and useful derivatives of citric acid monoesters and plastic compositions containing them.

The new and useful compounds of this invention are the products obtained by reacting alkali metal salts of citric acid monoesters with a dialkyl tin dihalide or citric acid monoesters with a dialkyl tin oxide or hydroxide. Such products may be represented by the following formula:

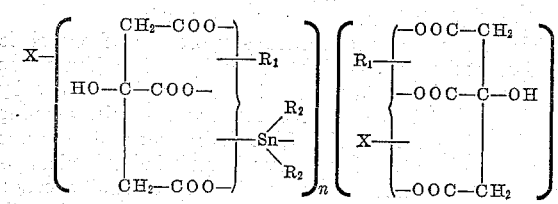

wherein X is selected from the group consisting of hydrogen and alkali metal; $R_1$ is selected from the group consisting of alkyl containing from 1 to 10 carbon atoms and alkenyl containing from 3 to 10 carbon atoms; $R_2$ is alkyl containing from 1 to 12 carbon atoms and "$n$" is an integer. One example of such compounds may be represented by the following formula:

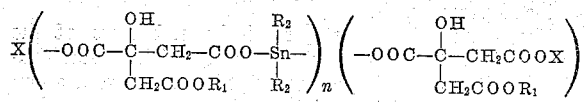

Of course, it is obvious to those skilled in the art that the position of the three carboxyl substituents i.e. —X, —$R_1$ and

may vary considerably, many structures of the compounds of this invention being possible by interchanging the substituents on the three carboxyl groups of citric acid. For example, the dialkyl tin radical may be attached to a primary or secondary carboxyl group of citric acid, while $R_1$ and X may each be attached to the remaining carboxyl groups. As is common knowledge, the carboxyl groups attached to the two terminal carbons of citric acid may be called primary carboxyl groups, the third, a secondary carboxyl group. It is obvious from the foregoing that there are many variations of the above formula differing as to the attachment of the three carboxy substituents as mentioned above. It is further obvious that the many variations give rise to the same general compound and are considered within the purview of this invention. The compounds of this invention may be best described as dicarboxylic acids comprising citric acid monoester moieties, the esterifying alcohol being selected from the group consisting of alkanols containing from 1 to 10 carbon atoms and alkenols containing 3 to 10 carbon atoms, adjacent citric acid monoester moieties being joined one to another by a dialkyl tin radical through the carboxy groups, each of said alkyl groups containing from 1 to 12 carbon atoms; and the alkali metal salts thereof.

Vinyl halide polymers such as the commercially important polyvinyl chloride and its copolymers are markedly subject to degradation when exposed to heat and light. The degradation is evidenced by considerable discoloration which may also be accompanied by the development of brittleness and loss of strength. This degradation is more particularly noted in product fabrication processes wherein elevated temperatures, for example, from about 130° C. and higher are employed for prolonged periods of time. Further the finished product in service may be subject to heat and light degradation. In the fabrication of products made from polyvinyl chloride polymers, waste scraps are salvaged and re-utilized. Frequently, unless stabilized, these waste scraps undergo further degradation in reprocessing. There is then in the art a need for stabilizers which impart both heat and light stability.

In this invention the term, vinyl halide polymers, encompasses polymerized vinyl halide and copolymers thereof, such as vinyl chloride copolymers with vinyl esters, acrylic compounds or vinylidene chloride, such copolymers being well known in the art. The preferred vinyl halide polymers include those containing at least 50% by weight vinyl chloride.

In general, vinyl halide polymer-stabilizers are limited in application. They usually serve either as heat stabilizers or light stabilizers but rarely are possessed of significant heat and light stabilizing properties at the same time. For example, cadmium and zinc soaps effect good light stability but only slight heat stability. At times the toxicity of a stabilizer, as in the case of lead compounds, limits its use.

Organo-tin compounds of the prior art are subject to numerous limitations. For example, dialkyl tin derivatives of maleic and citric acids are known heat and light stabilizers. However, because of their polymeric nature, these stabilizers are not found completely compatible with vinyl halide polymers and produce opaque plastic products. Further, they are incorporated in the plastic composition only with considerable difficulty because of their resinous nature. This is found to be particularly peculiar to dialkyl tin citrates which are found to be insoluble, infusible polymers that are not compatible with vinyl halide polymers and produce very opaque plastic products. In addition, when these dialkyl tin carboxylic acids are used at high concentration, for example, up to 5% by weight, the plastic sheets develop edge-blackening in a few hours when exposed to heat stability test. The maleates produce dangerous, noxious fumes during the fabrication of plastic products. Dialkyl tin maleic acid monoesters are also known vinyl halide stabilizers which are also subject to considerable limitations. The most outstanding of these is the tendency of plastic compositions containing these stabilizers to be opaque due to limited compatibility and the tendency to spew on exposure to light, resulting in oily surface of the plastic product. These stabilizers have a lachrymatory action which presents considerable difficulty in fabricating plastic products containing them, particularly on the open mill where the operator is exposed to their fumes.

It has now been found that the compounds of the present invention as described above are excellent stabilizers for plastics containing vinyl halide polymers, providing remarkable heat and light stability. These compounds are found free of the above described limitations.

The compositions of the present invention may be produced by mixing the selected stabilizer of the present invention with powdered polymers for fabrication into the desired product form. For example, in preparing flexible plastic sheets from vinyl chloride polymers such as polyvinyl chloride and the copolymers of vinyl chloride and vinyl acetate, the stabilizer is added to the finely powdered polymers in percentages ranging from about 0.5% to about 5% by weight, of the plastic composition. As is the procedure commonly employed in the art, at suitable plasticizer, for example, dioctyl phthalate, tricresyl phosphate, dioctyl adipate and others, may be added. The thoroughly blended mixtures are then charged to a two roll mill and heated at a temperature from about 130° to 160° C. This process is commonly employed and familiar to those in the art. The mixtures are thoroughly fluxed and mixed until a uniform sheet is obtained. The stability of the resultant flexible, almost transparent sheets is measured using standard accelerated test procedures well known to those in the art. For instance, a typical accelerated test for light stability is exposure of a specimen to ultraviolet light as in the Atlas Fadeometer for specific time intervals. The specimens are examined for evidence of breakdown, for example, the development of discoloration, brittleness or opaque spotting in the flexible sheets of the specimen. A second accelerated test involves evaluating the heat stability of the plastic sheet specimen. For this purpose, samples of the specimens are placed in an oven at elevated temperatures ranging from 150° to 180° C. Samples are removed at hourly intervals for a total of about 7 hours and inspected for discoloration or other evidence of degradation.

On milling the stabilized plastic compositions of this invention, no appreciable discoloration is noted in the flexible sheet when prolonged periods of time are employed. Further, when reprocessing salvaged pieces of flexible sheets, no discoloration is noted.

In the above mentioned accelerated tests, the compounds of this invention considerably retard degradation of the flexible plastic sheets by heat and light. In the heat stability test, the compounds of this invention impart almost perfect stabilization for a period of at least 7 hours at a temperature of 160° C., little, if any, discoloration being noted. Generally, further heat stabilizing effect is noted at successively longer time intervals although some discoloration takes place. In the light stability test, the plastic compositions containing the compounds of this invention showed remarkable stability. The herein described dialkyl tin citric acid monoesters imparted a light stability of over 500 hours. The plastic sheets containing the stabilizers of this invention are almost perfectly transparent and do not bloom and spew on exposure to light. In fabrication processes, they do not give rise to noxious or lachrymatory fumes and are found readily dispersible in and completely compatible with vinyl halide polymers.

The stabilizers of this invention are prepared from a citric acid monoester or an alkali metal salt of the monoester. For example, the sodium, lithium or potassium salt of the citric acid monoester is treated with a dialkyl tin dihalide, for example, dibutyl tin dichloride, dipropyl tin dibromide and so forth, in a suitable substantially anhydrous oxygenated solvent such as the lower alkanols, for example, methanol, ethanol or propanol and the mixture agitated at a temperature of from about 40° to about 80° C. for from about ½ to 2 hours. Longer reaction time is not required but is not found harmful. Stirring and heating is continued after the addition is complete. The resultant mixture is cooled and filtered to remove the insoluble salts. The filtered solution is then evaporated to dryness and the residue dissolved in benzene. The benzene solution is then freed of the remaining amounts of alkali metal halide by shaking with water. The product is then obtained by removal of the solvent, benzene, at reduced pressure. When a citric acid monoester is employed, it is reacted with a selected dialkyl tin oxide or hydroxide in a suitable solvent, for example, benzene, toluene or xylene. The reaction is usually effected at the reflux temperature of the solvent until the calculated amount of water is obtained, the water formed being removed as an azeotropic distillate with the solvent. The product is obtained by filtering the reaction mixture and evaporating the filtrate at reduced pressure.

The product obtained depends on the ratio of dialkyl tin compound to the citric acid monoester as is well known in the art. The ratio of reactants determines the nature of the product, for example, when a 2:1 molar ratio of citric acid monoester to dialkyl tin compound is reacted, the product obtained consists mainly of two citric acid moieties connected one to the other by a dialkyl tin compound; with a 3:2 molar ratio, three citric acid monoester moieties; with at 1.2 to 1 molar ratio, six citric acid monoester moieties, and so forth. The number of citric acid moieties contained in the product is determined by molar ratio of reactants. Generally, the number of dialkyl tin radicals contained in the product is one less than the number of citric acid moieties. Of course, mixtures of products may be obtained. Thus, the number of citric acid monoester moieties contained in the product is usually representative of the citric acid monoester content of the major product obtained. The preferred stabilizers are those in which the number of citric acid moieties ranges from 2 to about 21 since such stabilizers are usually found to be compatible with vinyl halide polymers and do not produce cloudy formulations.

The citric acid monoesters are prepared from citric acid and alkanols containing from 1 to 10 carbon atoms or alkenols containing from 3 to 10 carbon atoms by methods well known to the art, for example, reacting citric acid with one mole of the desired alcohol per mole of acid until one mole of water forms. Suitable alcohols are methanol, ethanol, decanol, octanol, octenol, decenol, propenol and other saturated and unsaturated alcohols of up to 10 carbon atoms. The alkali metal salts of citric acid monoesters may be prepared by a number of standard procedures, for example, reacting citric acid monoester with alkali metal hydroxides, carbonates, acetates and bicarbonates in aqueous solution. The salts may then be obtained by evaporation of the mixture at reduced pressure.

The preferred percentages of the stabilizers of the present invention to be used for heat and light stabilization of vinyl chloride polymer plastics range from about 0.5% to about 5% by weight of the plastic composition. Larger quantities of the stabilizer may be used but provide no appreciable advantage. Lesser amounts of the stabilizer, for example, 0.1% by weight will impart improved stability. The stabilizer is found to be readily dispersible in plastic compositions and may be added before or during the milling process with comparable efficiency.

The outstanding heat and light stability imparted to vinyl chloride plastic products by the compounds of this invention is totally unexpected. Many vinyl halide polymer stabilizers of the prior art are known to be either heat or light stabilizers. When such stabilizers are employed in vinyl halide plastics, they must be used together with other stabilizers to impart significant heat and light stability to the plastic product. Other stabilizers which impart significant heat and light stability are subject to a number of limitations, for example, the organo-tin compounds described above. Now it is possible, employing a single stabilizer as herein described, to effectively stabilize vinyl chloride plastics to heat and light degradation without the limitations of prior art stabilizers described above.

The following examples are given by way of illustration and are not to be construed as limitations of this invention many variations of which are possible within the scope and spirit thereof.

EXAMPLE I

A mixture of one mole of citric acid and 1.1 mole of the desired alcohol was prepared. The mixture was refluxed in a roundbottom flask until one mole of water was formed. The reaction mixture was then dissolved in benzene and water-washed to remove unreated citric acid. The reaction mixture was then extracted by a solution of sodium bicarbonate, the bicarbonate solution separated and then acidified with hydrochloric acid. The acidified mixture was exhaustively extracted with benzene and the combined benzene extracts evaporated to obtain the product. The citric acid monoesters were then recrystallized from hexane. The citric acid monoesters employed in the following examples were prepared using this procedure.

EXAMPLE II

The potassium salts of decyl, octyl, ethyl, methyl, allyl, octenyl and decenyl monoesters of citric acid were prepared by dissolving one equivalent of the monoester in a solution containing one equivalent of potassium carbonate. The resultant mixture was evaporated to dryness to obtain the potassium salt of the desired citric acid monoester. The sodium salts were prepared using this procedure.

EXAMPLE III

*Preparation of dialkyl tin derivatives of citric acid monoesters*

The potassium salt of the citric acid monoester was prepared by neutralizing the citric acid monoester with potassium carbonate in aqueous solution. One mole of the potassium salt, obtained by evaporation of the neutralization mixture, was then dissolved in dry ethanol and added dropwise to a solution of one mole of a dibutyl tin dichloride with stirring. The reaction mixture was maintained at a temperature of 60° C. and stirring continued for about ½ hours. The resultant solution was filtered and then evaporated under reduced pressure. The product was then taken up in benzene and washed with water. After drying, the benzene solution is evaporated under reduced pressure to obtain the dialkyl tin citric acid monoester. This procedure was employed to prepare the dialkyl tin monodecyl, monooctyl, monoethyl, monomethyl, monoallyl, monodecenyl, and monooctenyl citrates. The results are tabulated in Table I.

TABLE I

| Molar ratio of citric acid mono ester to dialkyl tin compound | Dialkyl tin dichloride | Number of citric acid monoester moieties in major product |
| --- | --- | --- |
| 2:1 | dibutyl | 2 |
| 3:2 | bis-dodecyl | 3 |
| 1.2:1 | bis-decyl | 6 |
| 1.1:1 | dimethyl | 11 |
| 2.1:2 | diethyl | 21 |
| 3:2 | dibutyl | 3 |

EXAMPLE IV

The process of Example III was repeated employing the sodium salt of the citric acid monoesters in place of the potassium salt.

EXAMPLE V

A mixture of a citric acid monoester and the dialkyl tin hydroxide of choice and dry benzene was refluxed until the calculated amount of water was obtained by removal of a water-benzene azeotrope. The reaction mixture was evaporated to dryness to obtain the product. Dibutyl bis-dodecyl, bis-decyl, dimethyl- and diethyl tin hydroxides were reacted with the same citric acid monoesters as in Example III employing the same molar ratios with comparable results.

EXAMPLE VI

A plastic formulation was prepared by admixing 60 parts of vinyl chloride polymers, such as a vinyl chloride (95%), vinyl acetate (5%) copolymer and 30 parts of a plasticizer (in this example, dioctyl phthalate), and 0.5 part of a lubricant (stearic acid). To this formulation, 0.5 part of the stabilizer was added. The mixture was thoroughly blended by hand mixing and charged to a two roll mill, heated to a surface temperature of about 130° C. The mixture was thoroughly fluxed and mixed for about 5 minutes and removed from the mill in the form of a uniform flexible sheet of 0.025 inch in thickness. Test specimens of flexible sheets containing the stabilizers described in Examples III, IV, and V were subjected to heat stability tests in the presence of air by placing in an oven maintained at 160° C. Specimens were removed periodically and examined for discoloration. Only slight yellowing of some of the specimens were noted after 3 hours. No increased discoloration was noted for up to seven hours of heating. Other specimens, for example, the stabilizers prepared from monoallyl citric acid, remained colorless for 7 hours at this temperature.

Test specimens of the flexible sheet were also subjected to light stability tests in the Atlas Fadeometer for 20 hour periods. Control specimens containing no stabilizer were dark brown at the end of the first 20 hour period while test specimens remained colorless even after 500 hours exposure.

EXAMPLE VII

The procedure of Example VI was followed employing 4.5 parts of the stabilizer described in Examples III, IV and V. Little, if any, yellowing was noted even after 7 hours of heating all test specimens in the heat degradation test.

In the Atlas Fadeometer, noticeable discoloration was not noted even after 500 hours exposure of these test specimens. No blooming or spewing was noted in the test specimens.

A flexible sheet prepared as in Example VI but containing 4.5 parts of dibutyl tin monoethyl maleate was opaque and became oily to the touch on exposure in the Atlas Fadeometer. The same results were obtained in a plastic sheet containing dibutyl tin monoallyl maleate.

EXAMPLE VIII

The procedure of Example VII was repeated employing polymerized vinyl chloride, "Geon Resin 101," in place of the vinyl chloride-vinyl acetate copolymer with comparable results.

What is claimed is:

1. A compound represented by the following formula:

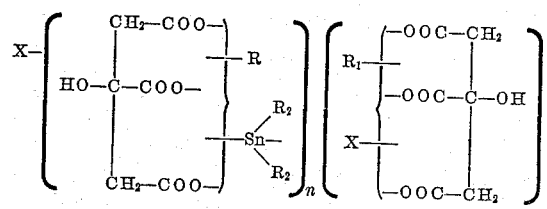

wherein X is selected from the group consisting of hydrogen and alkali metal; $R_1$ is selected from the group consisting of alkyl containing from 1 to 10 carbon atoms and alkenyl containing from 3 to 10 carbon atoms; $R_2$ is alkyl containing from 1 to 12 carbon atoms and "$n$" is an integer from 1 to 20.

2. A plastic composition which comprises a polymer of vinyl chloride and from about 0.5% to about 5% by weight based on the weight of the composition of the compound as claimed in claim 1.

3. A plastic composition as claimed in claim 2 wherein the polymer is polyvinyl chloride.

4. A plastic composition as claimed in claim 2 wherein the polymer is a vinyl chloride-vinyl acetate copolymer.

References Cited in the file of this patent

UNITED STATES PATENTS

| | | |
|---|---|---|
| 2,560,034 | Eberly | July 10, 1951 |
| 2,796,412 | Weinberg | June 18, 1957 |

FOREIGN PATENTS

| | | |
|---|---|---|
| 1,116,475 | France | May 8, 1956 |